United States Patent [19]
Diem

[11] 3,866,775
[45] Feb. 18, 1975

[54] FLUID SUPPORT AND DRIVE ARRANGEMENT FOR ROLLER TESTING DEVICES

[75] Inventor: Rudolf Diem, Schweinfurt, Germany

[73] Assignee: SKF Kugellagerfabriken GmbH, Schweinfurt, Germany

[22] Filed: May 4, 1973

[21] Appl. No.: 357,352

Related U.S. Application Data
[63] Continuation of Ser. No. 109,808, Jan. 26, 1971, abandoned.

[30] Foreign Application Priority Data
Feb. 3, 1970 Germany............................ 2004628

[52] U.S. Cl............................. 214/340, 308/DIG. 1
[51] Int. Cl............................................... B65g 7/00
[58] Field of Search ......... 214/338, 339, 340, 1 BE; 308/DIG. 1

[56] References Cited
UNITED STATES PATENTS
2,635,194  4/1953  Kellogg et al................... 214/340 X FOREIGN PATENTS OR APPLICATIONS
983,142  2/1965  Great Britain................. 308/DIG. 1

Primary Examiner—Robert G. Sheridan
Attorney, Agent, or Firm—Murray Schaffer

[57] ABSTRACT

Apparatus for automatically inspecting the surface of bodies of rotation which includes fluid support means for driving the body. The support means comprise a drive wheel and a plurality of elements arranged about the circumference of the body having conduit means connected to a source of a pressurized medium. A cushion of the medium is formed between the interface of the supports and the body.

8 Claims, 4 Drawing Figures

PATENTED FEB 18 1975 3,866,775

*INVENTOR.*
RUDOLF DIEM

BY Murray Schaffer

ATTORNEY

FLUID SUPPORT AND DRIVE ARRANGEMENT FOR ROLLER TESTING DEVICES

This is a continuation of Ser. No. 109,808 filed Jan. 26, 1971, now abandoned.

BACKGROUND OF INVENTION

The present invention relates to apparatus for testing bodies of rotation and in particular for supporting and driving such bodies as conical roller bearings in automatic machines for testing the surface quality thereof.

This application is a companion to application Ser. No. 109,807 filed on even date herewith, now U.S. Pat. No. 3,787,983. The companion case discloses related structure having similar function. Its disclosure is incorporated herein and all legal and equitable benefits derivable therefrom are claimed.

As the final step in the manufacture of precision and high quality bearings, conical rollers, as well as cylindrical, spherical, barrel, and other types of roller bodies are subjected to an inspection of their entire surface for such flaws as cracks, holes, scratches, and other irregularities in surface uniformity. Conventionally, the sensor head or probe of a chosen optical, electroinductive, photo-electrical, tactile, or other known sensing system is made to sequentially scan the entire surface of the body. Suitable circuitry, mechanism, etc., designed to determine the accuracy, quality, and frictionless performance of the body are employed to interpret the information scanned. To obtain an accurate result it is necessary to rotate the bearing body so that the relative movement between it and the sensor exposes the entire surface of the body to the scanning beam or probe.

Conventional arrangements for rotating the body to be tested generally comprise at least three rollers arranged about the circumference of the body. One of the rollers serves as the driving element whereas the others are arranged oppositely thereto to serve as backing or supporting members. These known devices are capable under certain circumstances to cause changes in the surface of the body to be tested during rotation whereby the test results are vitiated. This is the case particularly when the rolling engagement between the body to be tested and rollers of the drive arrangement is so unfavorable that in addition to pure rolling movement a component of axial or sliding movement occurs. This disadvantage is most pronounced when conical bodies of rotation such as conical roller bearings are supported by cylindrical rollers which extend over a substantial length of the body. Because of the differences generated in the circumferential velocities of the conical body and of the cylindrical rollers a sliding movement occurs along the line of contact with the body. Defects in the surface of the body are thus induced.

It is an object of the present invention to provide a support and drive arrangement for use in a testing device for bodies of rotation which overcomes the disadvantages of the prior art.

It is another object of the present invention to provide a support and drive arrangement for a testing device of the type described which may be employed with bodies of rotation of any shape including spherical, barrel, and conical rollers.

It is still another object of the present invention to provide a support and drive means of type described which avoids any damage or effect on the body rotated therebetween and which provides for a more precise and accurate testing mechanism.

These objects, and others as well as numerous advantages will be seen from the following description.

SUMMARY OF INVENTION

According to the present invention apparatus for testing and inspecting the surface of bodies of rotation is provided with an arrangement for supporting and driving the body which comprises a drive element and a plurality of supporting elements. The supporting elements are arranged about the circumference of the body and are provided with means for conducting a pressurized medium to the face of the body forming a cushion of the medium between the support and the body.

Preferrably the supporting elements are elongated rails extending over a substantial part of the body to be rotated and have one or more conduit means connected to a source of pneumatic, aero or hydro-static pressurized medium.

Suitable pressure source such as pumps and throttling valves are provided to regulate the flow of the medium.

BRIEF DESCRIPTION OF THE DRAWINGS

In the description reference is made to the accompanying drawing in which.

DESCRIPTION OF INVENTION

Before turning to the description of the present invention it is noted that the drawings are in schematic form having omitted from it various details of construction which are well known to those skilled in the art. In addition the details of the scanning, sensing or test system are also omitted since any one of the conventional systems may be used in their well known manner. A full understanding of the present invention can be made without such details.

Figure 2:
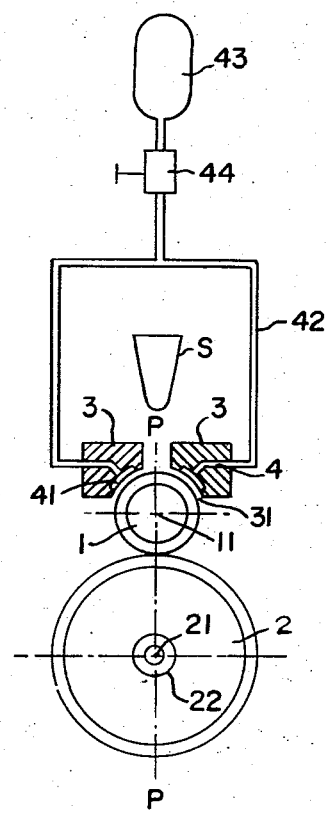
FIG. 2 is a sectional view in similar form taken along line 2—2 of the apparatus seen in FIG. 1, and FIGS. 3 and 4 show a modified drive means.
Figure 1:
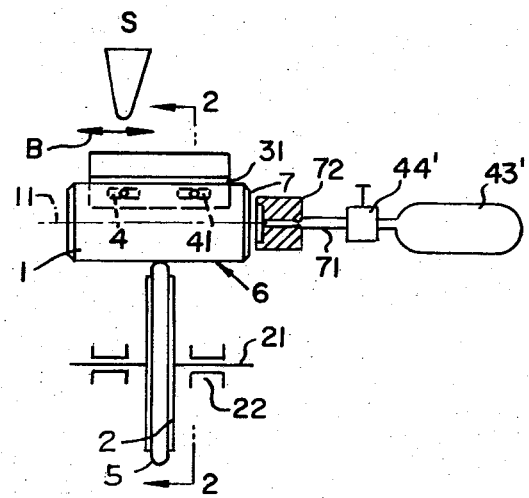
FIG. 1 is a schematic line, side view of the present invention showing the body arranged between the support and drive means.

Turning now to FIG. 1, the present invention is adapted to support and drive a body of rotation 1, such as a roller of cylindrical shape which is to be tested. The roller is pressed with a constant force against a drive wheel 2 by a source of pneumatic or hydro-static pressure delivered through a pair of guide rails 3 via channels 4 pressing on the surface of the body 1. The drive wheel 2 is provided with an arcuate rim 5 of sufficient friction to drive the body 1. The rim 5 is shaped to make only point contact with the circumferential surface of the body.

The drive wheel 2 is mounted on shaft 21 journalled in a suitable bearing 22 for rotation about the axis of the shaft. Suitable drive means including a motor M and transmission are connected to the shaft 21 to drive the wheel at a predetermined or even variable speed. The body 1 which is being tested is arranged to have its outer surface 6 rest on the rim 5 and to have its own axis 11 extending in a radial plane P—P in common with the shaft 21 of the drive wheel so that the drive wheel 2 is arranged transversely of the body 1 and substantially at its longitudinal center.

The wheel 2 is similar to that described in the aforementioned companion application to which reference for further details may be made. The showing here of a wheel is merely to illustrate a drive mechanism. The wheel may be replaced with other devices such as the drive roller depicted in FIGS. 3 and 4 or still other known devices. While a cylindrical body to be tested is shown in this case, it will be obvious from what has preceded here and what will follow that conical, barrel shape, and other shaped body may be just as easily rotated.

The rails or supports 3 are conventionally formed of strip or stock metal, wood, or plastic to have an undersurface 31 conforming to the shape and configuration of the body to be tested. Here the shape is cylindrical although it may be conical, arcuate, or barrel shaped when necessary. The underface 31 is provided with one or more pockets, cut-outs or recesses 41 extending over a significant area. Extending transversely from the slot or cut-out 41 is the channel 4 which is connected via a conduit 42 to a source 43 of media such as air gas or liquid. The source may be a pump. Suitable valves 44 are provided to regulate the flow of the media. The fluid source is chosen from any well known areo, pneumatic or hydrostatic system, the details of which are quite common.

The rails or supports 3 are mounted to the frame or other support of the testing device so as to be adjustably spaced from the surface of the body 1 to be tested. Suitable articulated brackets, stop pins, springs, screw adjustments etc., are provided so that the spacing between the interfaces of the rail and body can be predetermined to provide a cushion of the fluid media between them which has the desired depth and pressure.

The pressure of the fluid is regulated by the source and the throttling valves to provide a cushion sufficient to remove all surfaces of the body 1 from the undersurface of the support 3 and to provide a sufficient amount of interfacial pressure to press the body 1 against the drive wheel 2 so that the wheel will drive the roller at the desired speed.

Figure 4:
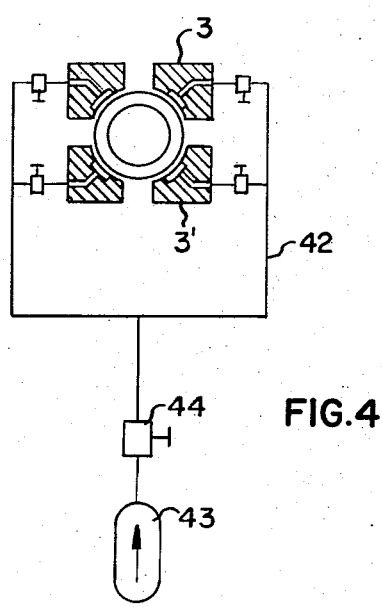
Figure 3:
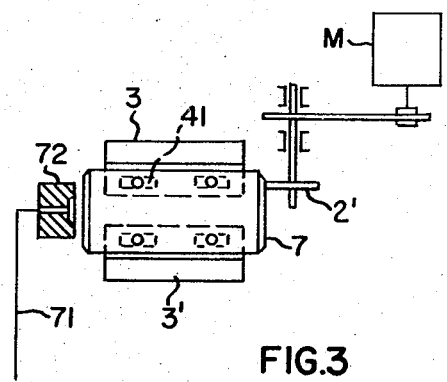

Instead of locating the drive wheel 2 at the position shown to contact the circumferential surface 6, the body 1 may be supported completely about its circumference with a fluid cushion as seen in FIGS. 3 and 4. Thus the drive wheel can be replaced by a support 3' and the drive wheel 2' placed to contact one of the frontal ends 7 of body 1 and driven by a motor M. In this case the body 1 is supported by a pressurized cushion over its entire periphery.

Each of the supports 3' may be fed from a common pressure source 43 and/or may be provided with independent sources, if desired. The valves 44 are employed to provide means for throttling or regulating the pressure flow so that pressure is delivered to form a uniform cushion between the interface and to prevent excessive pressure from any one of the supports. The regulation is selective and controllable to provide a system for accommodating variations in bodies to be tested. Air is the preferred pressure media particularly when the sensing head or scanning probe may be effected by a liquid or gaseous media.

The pressure media itself may be impinged upon the frontal end 7 of the body through a conduit 71 to provide an end stop or axial locating means for the body 1 with respect to the supports 3'. An auxilliary pneumatic or hydrostatic system may be employed or conduit 71 may be fed through the source 43. It will be obvious that it is only necessary to adapt shape of the support 3 to conical, barrel, or ball underfaces for the arrangement to be useful for other than cylindrical bearings. No change in principle is required for operation of the pressure medium or other elements. When bodies other than cylindrical bodies are being tested the drive wheel supports etc., may be arranged geometrically as shown in the aforementioned companion application so that rotation about the axis of rotation is obtained without any sliding movement between the surface of the body and the device means. The oblique arrangement, end stop means and triangular array of the elements may be obtained from reference to the companion application.

The sensing head or probes of the sensing system may be arranged between the supports 3 and as provided in the companion case it may be movably mounted along the direction of the arrow B to scan the entire surface of the body 1, as seen in FIG. 1.

The present arrangement has a number of advantages. Foremost, is the fact that the circumference of the body to be tested can be driven without any wheel or roller touching its surface. In any event, only the drive wheel need engage the body and as pointed out this can be done at the frontal end. Thus the operative surface of the body cannot be damaged or injured by the interaction of it with the drive and support elements. A second advantage lies in the fact that the arrangement is simple and has few moving parts. Also the arrangement is easily adapted for all types of bodies of rotation which may be interchangeably tested without a complete rebuilding of the testing mechanism.

Numerous modifications, changes and equivalent structures and functions have been disclosed; others will be obvious to those skilled in this art. It is to be therefore, understood that the present disclosure is intended only to illustrate the present invention and not to be limiting in any manner of its scope.

What is claimed is:

1. In an apparatus for testing and inspecting the surface of an elongated body of rotation, an arrangement for supporting and driving said body about its longitudinal axis comprising a driving wheel adapted to engage the surface of said body at a point on its surface, a plurality of supporting elements, at least one of said supporting elements being spaced about said body, in opposition to said driving wheel, at least one of said supporting elements being spaced from the axial end of said body and the remainder of said supports being spaced from the circumference of said body, means for conducting a pressurized medium through said supporting elements to the face of said body, said medium forming a cushion between the interfaces of said body and said supports maintaining said supports supports spaced from said body, said supports and said driving wheel being arranged to cause said medium to retain said body against said drive wheel and against sliding movement with respect to the drive means.

2. The arrangement according to claim 1 wherein said circumferential supports comprise an elongated rail having a face conforming to and extending substantially the length of said body, including one or more conduit means extending therethrough and a source of pressurized media connected to said conduits.

3. The arrangement according to claim 2 wherein said driving element is a wheel engaging the circumference of the surface of said body and said circumferential supporting elements are arranged in opposition thereto.

4. The arrangement according to claim 2 including means for regulating the flow of pressurized media to the faces of said support.

5. The arrangement according to claim 4 including means for independent delivery fluid pressure to each of said supports.

6. The arrangement according to claim 4 wherein the pressure medium is a hydrostatic fluid.

7. The arrangement according to claim 4 wherein the pressure medium is a pneumatic fluid.

8. In an apparatus for testing and inspecting the surface of a body of rotation having a central longitudinal axis, an arrangement for supporting and driving said body about said axis comprising a driving wheel engaging an end of said body at a point on its surface, a plurality of supporting elements arranged about the circumference of said body and at the end opposite the driving element, said supporting elements having means for conducting a pressurized medium to the surface face of said body and forming a cushion of said medium between the interfaces of said body and said support maintaining said body in contact with said drive wheel.

* * * * *